(12) United States Patent
Smith et al.

(10) Patent No.: US 7,383,260 B2
(45) Date of Patent: Jun. 3, 2008

(54) METHOD AND APPARATUS FOR ONTOLOGY-BASED CLASSIFICATION OF MEDIA CONTENT

(75) Inventors: John R. Smith, New York, NY (US); Belle L. Tseng, Cupertino, CA (US); Yi Wu, Goleta, CA (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/910,118

(22) Filed: Aug. 3, 2004

(65) Prior Publication Data

US 2006/0031217 A1    Feb. 9, 2006

(51) Int. Cl.
*G07F 17/30*    (2006.01)
*G06F 15/16*    (2006.01)
(52) U.S. Cl. .......................................... 707/5; 707/102
(58) Field of Classification Search .................... 707/5, 707/102
See application file for complete search history.

(56) References Cited

U.S. PATENT DOCUMENTS

| 6,233,575 B1 | 5/2001 | Agrawal et al. | 707/6 |
|---|---|---|---|
| 6,643,643 B1* | 11/2003 | Lee et al. | 707/5 |
| 7,099,860 B1* | 8/2006 | Liu et al. | 707/3 |

OTHER PUBLICATIONS

Clausen et al., "An Efficient Indexing and Search Technique for Multimedia Databases", University of Bonn, Bonn, Germany, 12 pages, 2003.

G. Iyengar, H.J. Nock, C. Netl, "Discriminative Model Fusion for Semantic Concept Detection and Annotation In Video", ACM Multimedia, Berkeley, California, Nov. 2003.
H. Blockeel, M. Bruynooghe, "Hierarchical multi-classification", KDD-2002 Workshop, pp. 21-35, 2002.
S. D'Alessio, K. Murray, R. Schiaffino, and A. Kershenbaum, "The Effect of Using Hierarchical Classifiers in Text Categorization", In Proc. of the 6th Int. Conf. "Recherche d'Information Assistee par Ordinateur", pp. 302-313, Paris, FR, 2000.
M. Naphade, S. Basu, J. Smith, C. Lin, and B. Tseng, "Modeling Semantic Concepts to Support Query by Keywords in Video", In IEEE International Conference on Image Processing, Rochester, NY, Sep. 2002.

(Continued)

*Primary Examiner*—Cam Y. Truong
*Assistant Examiner*—Alex Gofman
(74) *Attorney, Agent, or Firm*—Duke W. Yee; Anne Dougherty; Peter B. Manzo

(57) ABSTRACT

A method and apparatus for ontology-based classification of media content are provided. With the method and apparatus, initial confidence values of classifiers in a hierarchical classification structure are modified based on relationships between classifiers. A confidence value for a classifier is boosted by a boosting factor based on a correspondence between the confidence value and confidence values of ancestor classifiers in the hierarchical classification structure. A confidence value for a classifier is modified by a confusion factor based on a correspondence between the confidence value of the classifier and the confidence values of mutually exclusive classifiers in the hierarchical classification structure. In this way, a more accurate representation of the actual confidence that media content falls within the classification associated with the classifier is obtained. From this improved classification mechanism, indices for media content may be generated for use in accessing the media content at a later time.

6 Claims, 6 Drawing Sheets

OTHER PUBLICATIONS

A.D. Doulamis, N.D. Doulamis, and S.D. Kollias, "A fuzzy video content representation for video summarization and content-based retrieval", Signal Processing, vol. 80, No. 6, Jun. 2000.

S. Tong and E. Chang, "Support Vector Machine Active Learning for Image Retrieval", Proceedings of ACM International Conference on Multimedia, pp. 107-118, Oct. 2001.

E. Chang, B. Li, G. Wu, and K.S. Goh, "Statistical Learning for Effective Visual Information Retrieval", IEEE International Conference on Image Processing (ICIP), pp. 609-612, Barcelona, Sep. 2003.

A. McCallum, R. Rosenfield, T. Mitchell, and A. Ng, "Improving Text Classification by Shrinkage in a Hierarchy of Classes", In ICML-98, pp. 359-367, 1998.

B. Li, K.S. Goh, and E. Chang, "Confidence-based Dynamic Ensemble for Image Annotation and Semantics Discovery", ACM Multimedia, Berkeley, Nov. 2003.

Griffioen et al., "Content-based Multimedia Data Management and Efficient Remote Access", http://www.uky.edu/~kiernan/DL/brent.html, 13 pages, 1995.

* cited by examiner

METHOD AND APPARATUS FOR ONTOLOGY-BASED CLASSIFICATION OF MEDIA CONTENT

BACKGROUND OF THE INVENTION

1. Technical Field

The present invention is generally directed to an improved data processing system. More specifically, the present invention is directed to an improved data processing system in which media content is classified using an ontology-based classification mechanism such that media indices may be generated for use in modeling and/or retrieving the media content.

2. Description of Related Art

The growing amounts and importance of digital video data are driving the need for more complex techniques and systems for video and multimedia indexing. Multimedia indexing is the process by which multimedia content is classified into one or more classifications based on an analysis of the content. As a result of this classification, various multimedia indices are associated with the multimedia content. These indices may then be stored for later use in modeling the multimedia content, retrieving the multimedia content in response to search queries, or the like. Some recent techniques for multimedia indexing include extracting rich audio-visual feature descriptors, classifying multimedia content and detecting concepts using statistical models, extracting and indexing speech information, and so forth. While progress continues to be made on these approaches to develop more effective and efficient techniques, the challenge remains to integrate this information together to effectively answer user queries of multimedia repositories. There are a number of approaches for multimedia database access, which include search methods based on the above extracted information, as well as techniques for browsing, clustering, visualization, and so forth. Each approach provides an important capability.

One methodology for multimedia indexing involves classification of multimedia content into a plurality of classifications, i.e. multiple classification. In the multiple classification area, each portion of multimedia input data is mapped into one or several possible concepts. For example, a "studio-setting" image or video can have two "newsperson" "sitting" behind a "desk". This individual image or video content contains four concepts: "studio-setting", "newsperson", "sitting" and "desk". For each concept, an associated classifier is developed for determining how to classify image or video data into that particular concept. This development is typically performed through a specific learning process. Thus, once the classifier has been developed, given unlabeled video or image data, the classifier can determine whether this shot contains the corresponding semantic concept, e.g., "studio-setting," "newsperson," or "desk." The classification methodology of learning classifiers is essential to various multimedia applications, such as multimedia content abstraction, multimedia content modeling, multimedia content retrieval, and the like.

However, the learned classifiers, especially those whose semantic coverage is very restrictive, are usually unreliable. This is most typically due to an under-representative training data set used to develop the classifiers, and imbalanced ratio of positive and negative training data, and other factors. Quite a few previous efforts have been made in the direction of improving individual classifiers based on other classifiers in the multiple classification area. However, these previous approaches lack the capability to improve the accuracy of individual classifiers from the reliable classifiers by studying the ontology structure. Unfortunately, taking influence from unreliable classifiers makes the system vulnerable to becoming unstable.

For example, the system described in U.S. Pat. No. 6,233,575, entitled "Multilevel Taxonomy Based On Features Derived from Training Documents Classification Using Fisher Values as Descrimination Values," issued on May 15, 2001, which is hereby incorporated by reference, organizes multiple concepts into a hierarchical decision tree. Each node represents one concept classifier. Classification decisions are made from a top-down traversal of the decision tree. However, concept classification is restricted in a sub-tree of the decision tree. This sacrifices global information and an error decision made in a top level of the decision tree may be propagated and accumulated in later sub-tree classifications.

Reclassification models take classification outputs from single concept models as new features and then perform reclassification in order to improve performance of the classification model. The assumption behind reclassification is that points close in the feature space tend to produce similar outputs operated by these classifiers. However, the assumption of high-correlation classification outputs between various concepts might not be true. Furthermore, taking influence from unreliable classifiers would make the system vulnerable to becoming unstable.

SUMMARY OF THE INVENTION

The present invention provides a method and apparatus for improving the accuracy of classifiers based on taking information from other semantically related and reliable classifiers. The ontology-based multiple classification method and apparatus of the present invention addresses the problems of the known systems by exploring reliable paths in an ontological structure to improve the accuracy of classifiers. The present invention applies boosting factor to a classifier by taking information from reliable classifiers and boosting the accuracy of the classifier based on a correspondence between the classifier and the reliable classifiers. The amount of influence a classifier should take from other reliable classifiers is based on data correlation.

In addition, the present invention applies a confusion factor to a classifier by taking information from its mutually exclusive peer concepts. Given input data, the larger the confidence score from a first classification of the input data compared to those from other exclusive classes of the input data, the more likely that data truly belongs to the first classification. This confusion factor is used to adjust the prediction scores from a classifier to further differentiate it from its exclusive peers.

These and other features and advantages of the present invention will be described in, or will become apparent to those of ordinary skill in the art in view of, the following detailed description of the preferred embodiments.

BRIEF DESCRIPTION OF THE DRAWINGS

The exemplary aspects of the present invention will best be understood by reference to the following detailed description when read in conjunction with the accompanying drawings, wherein.

DETAILED DESCRIPTION OF THE PREFERRED EMBODIMENTS

Figure 1:
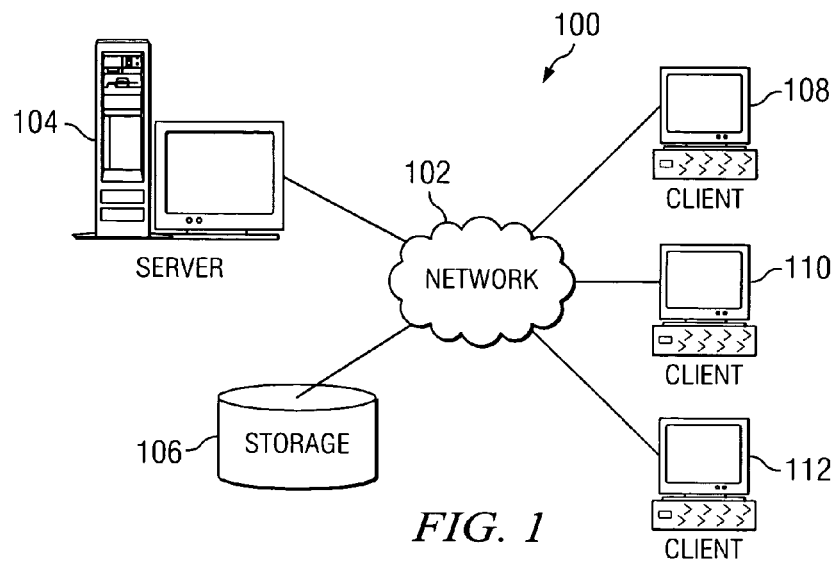
FIG. 1 is an exemplary diagram of a distributed data processing system in which aspects of the present invention may be implemented.
Figure 2:
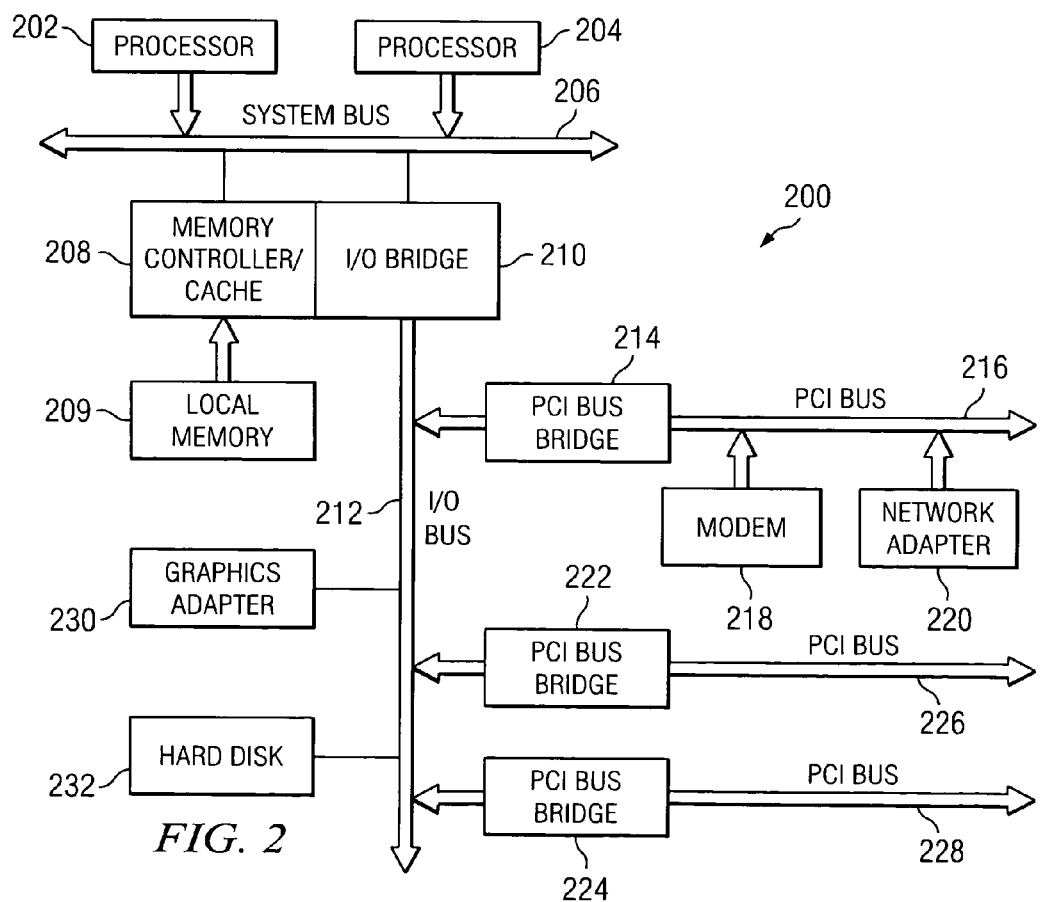
FIG. 2 is an exemplary diagram of a server computing device in which aspects of the present invention may be implemented.
Figure 3:
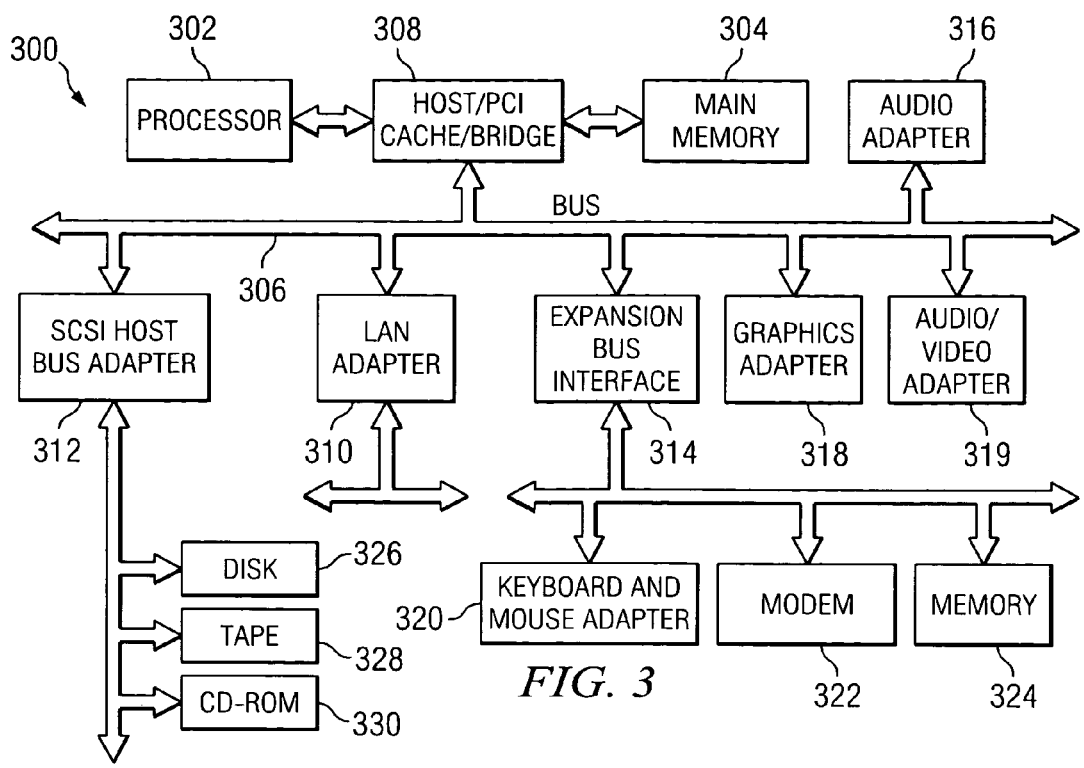
FIG. 3 is an exemplary diagram of a client computing device which may communicate with the server computing device of FIG. 2 via one or more networks as illustrated in FIG. 1.

The present invention provides a mechanism for improving the classification of media content by content classifiers using an ontology structure and correspondence between classifications within this ontology structure. The present invention, being directed to content classification, although able to be implemented in a single computing device, is especially well suited for use in a distributed data processing environment in which media content may be obtained from a plurality of different sources. Therefore, the following FIGS. 1-3 are provided as examples of the data processing environment and computing devices in which aspects of the present invention may be implemented in accordance with exemplary embodiments of the present invention. It should be appreciated that FIGS. 1-3 are only exemplary and many modifications to the environment and computing devices depicted in these figures may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with exemplary aspects of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which exemplary aspects of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention is directed toward an apparatus and method for an efficient multiple classification model in which classifications are improved by taking into account the ontological structure of the possible classifications. The present invention employs an ontology structure defining possible relationship among classifiers based on their corresponding semantics. The present invention utilizes information from reliable classifiers to modify the correspondence of a classification to a particular input data. Since only reliable classifiers are utilized performance of the multiple classification model is made more stable than known classification mechanisms.

A first step in the operation of the present invention is to independently construct each single concept model. This step is similar to known mechanisms for constructing concept models. For example, a mechanism such as that described in U.S. Pat. No. 6,233,575, which has been incorporated above, may be utilized to construct a concept model for each node in a hierarchical tree of topical concepts. Other hierarchical classification mechanisms may be used to generate a classification model based on embedded information in the multimedia content.

Using the hierarchical topical concepts from U.S. Pat. No. 6,233,575 as exemplary of a classification mechanism with which the present invention may be utilized, exemplary aspects of the exemplary embodiments of the present invention include an automatic process for learning classes from training media content and later identifying the classes of new media content. The process employs a multilevel ontological structure having a plurality of nodes, including a root node, at least one intermediate node associated with and under the root node and a plurality of terminal nodes associated with and under each intermediate node. A different classification is associated with each intermediate node which is used to classify the media content into various classes. The classes are determined, according to preferred embodiments, during a training procedure.

The training procedure, according to preferred embodiments, employs a plurality of training media content that have been pre-assigned manually to various terminal and intermediate nodes in the ontological structure. The training media content are tokenized, and information related to the frequency of tokens is recorded in a database. A discrimination value is determined for each token in the training media content, and a minimum discrimination value is determined. Then, for each intermediate node, a set of feature tokens is selected, where the feature tokens are those that are in the training media content associated with the intermediate node or any of its descendants and that have discrimination values equal to or above the minimum discrimination value for the intermediate node.

Once the system is trained, new media content is analyzed. During this phase, the new media content is first tokenized. Of all the tokens in the new media content, only those that are also in the feature token set of the root node in the ontological structure are considered useful. The statistics related to these useful tokens are retrieved from the database, and the statistics are used to compute a score for each of the children of the root node (nodes comprising the next level connected to the root node). A few children with high scores are then picked for further exploration. If any child is an intermediate node, it has associated with it another feature token set. The set of all tokens in the new media content is now intersected with this new feature token set, and the procedure continues from the child in the same manner.

Organization and classification of information items, according to the exemplary embodiments of the present invention, involves an ontological structure, preferably having a plurality of levels of nodes. This ontological structure is generated based on a classification hierarchical structure. While embodiments of the invention may employ any directed acyclic graph hierarchy structure, embodiments are described herein with reference to a tree-like classification hierarchy.

Figure 4:
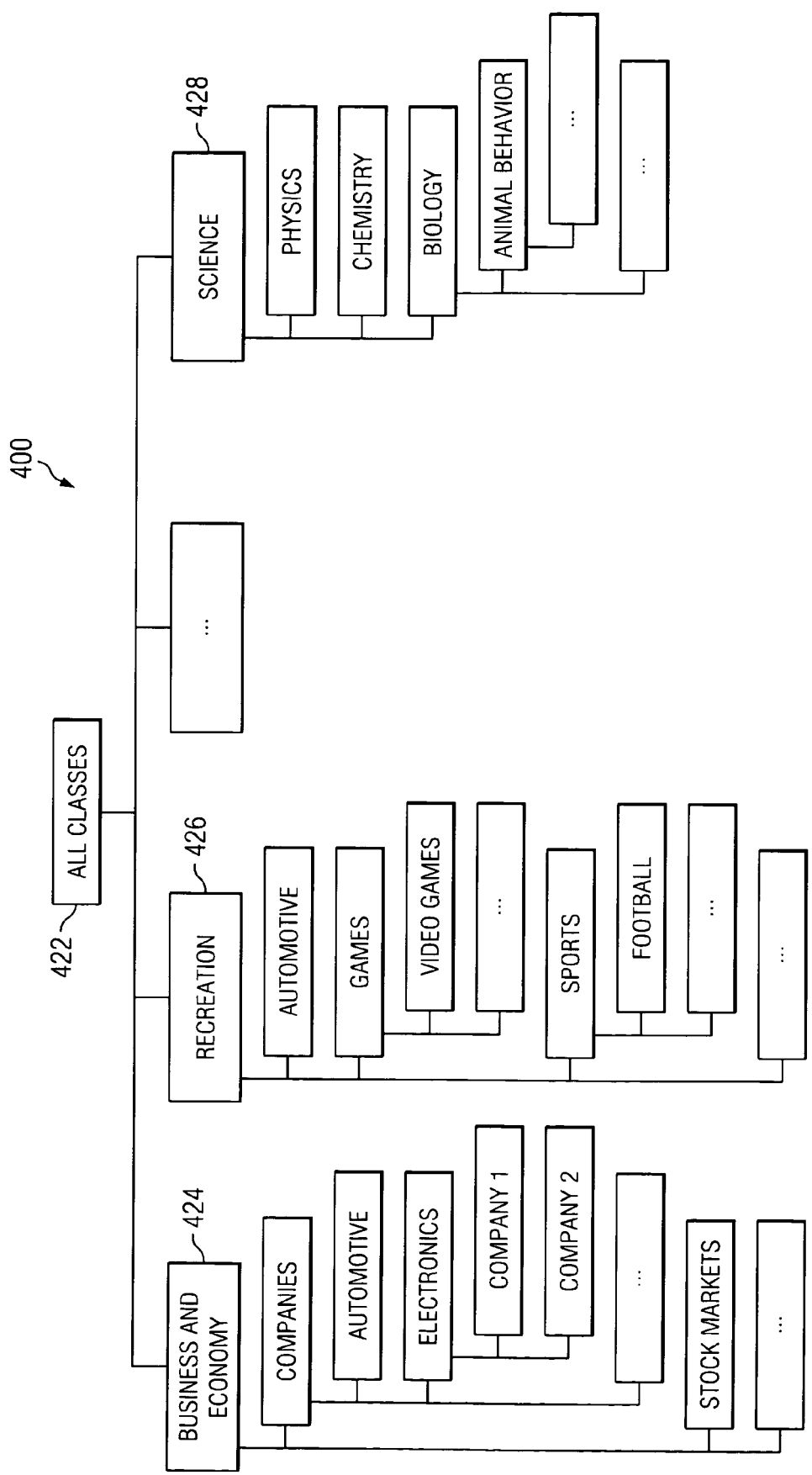
FIG. 4 is an example of a tree-like class hierarchy for organizing a database of media content.

An example of a tree-like classification hierarchy for organizing a database of topical documents is shown in FIG. 4. The tree 400 includes a first level comprising a single node 422 entitled "All Classes." A second level of the tree may divide the first level "All Classes" node into several further nodes directed to general class categories, such as Business and Economy 424, Recreation 426, Science 428, and so forth. Each of the second level nodes may be divided, at the third level, into several further nodes directed to more specific classes within each second level class. For example, at the third level, the Business and Economy class 424 may be divided into Companies, Stock Markets, and so forth. Similarly, each of the other second level classes may be divided at the third level to further classes. Also, in a similar fashion, further levels under the third level may be included in the class hierarchy. The final level of each path in the classification hierarchy terminates at a terminal or leaf node. The classification hierarchy in the diagram is provided as an example for purposes of simplifying the present disclosure and is not intended to limit the invention to the specific illustration of the classification hierarchy.

Thus, in a first step of one exemplary embodiment of the present invention, a classification hierarchy is determined through a training and testing process. The result is a hierarchy of classes that may be represented, for example, as a tree graph class hierarchy. The class hierarchy includes a plurality of nodes that have associated classifiers or class models that represent the attributes of data that correspond to the particular classification associated with the classifier or class model. That is, a plurality of attributes is established for each node of the tree graph class hierarchy identifying the particular attributes that are characteristic of data matching the classification for that node. These models are later used to determine if actual input media data corresponds to that classification.

This class hierarchy may be used, along with input data, to generate an ontological structure for the particular set of input data. That is, input data is provided to the classification hierarchy model generated in the first step of the present invention, and an initial result is obtained from the hierarchical classification model. This result may include, for example, correspondence information for each node in the hierarchical classification model indicating how well the input data corresponds to a classification associated with that node, as determined by the classifiers or class models for the nodes.

An ontological structure is generated that includes not only the classification hierarchy, wherein each node represents a possible classification, but also the correspondence information. This correspondence information may be, for example, a confidence score associated with the nodes that indicates a confidence probability that the input data matches the corresponding classification for that node. This correspondence information is used in a second step of the exemplary embodiments of the present invention to improve the reliability of the classifications made by the classifiers in the first step of the exemplary embodiments of the present invention.

In a second step of this exemplary embodiment of the present invention, the accuracy of individual concept models, i.e. classifiers, is improved based on considering outputs from other related concept models or classifiers. The accuracy of classifiers may be improved based on other reliable classifiers by employing boosting factors and confusion factors in the ontological structure. The main idea of the boosting factor is to boost the precision of concepts by taking influences from more reliable ancestors in the hierarchy of classes. By the Shrinkage theory, described in "McCallum et al. "Improving Text Classification Text by Shrinkage in a Hierarchy of Classes," ICML-98, pp. 359-367, 1998, which is hereby incorporated by reference, parameter estimates in data-sparse children may be adjusted toward the estimates of the data-rich ancestors in ways that are optimal under appropriate conditions.

The present invention employs one form of shrinkage that creates a new parameter estimate, e.g., a confidence score, for a child node by a linear interpolation of a similar parameter from all ancestor hierarchy nodes from the root node to the child node. The value of the boosting factor for boosting the original confidence score to the new confidence score is decided by considering the confidence score correlation between the child node and its ancestor nodes. Similar confidence score distributions between two classes implicates that the coherence between them tends to be high. Therefore, if the confidence score distribution between the ancestor node and the child node has a high correlation, more influence from that ancestor node is assigned to the child node.

The main idea of the confusion factor, used in exemplary embodiments of the present invention, is to improve the reliability of classifiers or class models by taking information from their mutually exclusive peer classifiers or class models. Given input media data, the larger the difference between the media data's confidence score from one class C compared to those from other exclusive classes, the more likely that input data truly belongs to the class C. In accordance with exemplary aspects of the present invention, the confidence score of a classifier or class model is adjusted to further differentiate it from its exclusive peer classifiers or class models.

The exemplary embodiments of the present invention may be utilized with any hierarchical content classification mechanism for media content, e.g., textual, graphical, audio or video content. As mentioned above, such classification mechanisms may be used to provide index information that can be used with a number of different applications. For example, indices generated through a hierarchical content classification mechanism may be used to model the content, provide a search engine for searching media content, or the like. For purposes of the explanation of the exemplary aspects of the present invention in this description, it will be assumed that the hierarchical content classification mechanism and the improvement mechanism of the present invention are directed to generating an index for media content and providing a mechanism for searching such an index.

Figure 5:
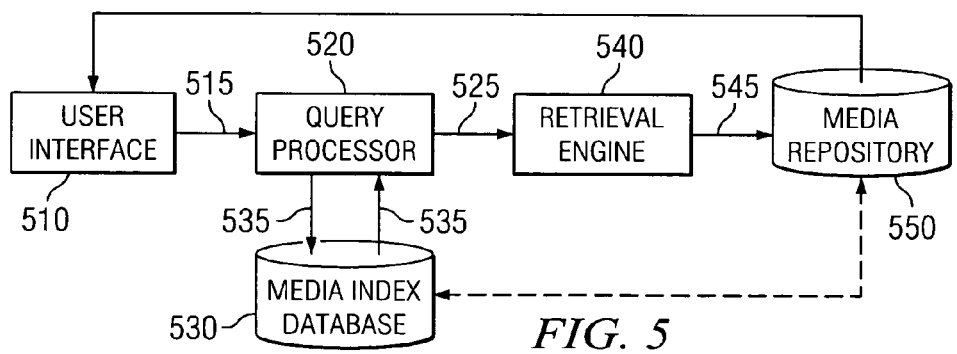
FIG. 5 is an exemplary diagram illustrating the primary operational components of a media search engine in accordance with aspects of one exemplary embodiment of the present invention.

FIG. 5 is an exemplary diagram illustrating the primary operational components of a media search engine in accordance with aspects of one exemplary embodiment of the present invention. As shown in FIG. 5, a user, through a user interface 510 may issue a query 515 to a multimedia information retrieval system. The query is handled by a query processor 520 in the multimedia information retrieval system which receives the query and searches in step 535 the set of stored index values 530 to find matches to the user's query. The final set of matches 525 are passed to a retrieval engine 540 and matching media content are retrieved from the multimedia repository 550 and provided to the user via the user interface 510. The corresponding media content are determined on the basis of the association of the identifiers or keys in the results 525 with specific media content in the media repository 550.

The exemplary embodiments of the present invention are directed to an improved method and system for generating the indices in the media index database 530. That is, the indices in the media index database 530 are generated by analyzing and classifying the media content in the media repository 550 using a hierarchical content classification mechanism, such as that previously described above. The correspondence between classifications within the hierarchical content classification mechanism is improved by the operation of the present invention which takes into account the increased reliability of ancestor nodes in the hierarchy as well as information regarding mutually exclusive classifications. In so doing, the confidence with which certain classifications are made is increased and, as a result, the accuracy of the classification of the media content is improved.

From the classification of the media content, one or more indices describing the media content may be generated and stored in an index for the media content. This index for the media content may then be added to the media index database 530 for use by the multimedia information retrieval system.

Figure 6:
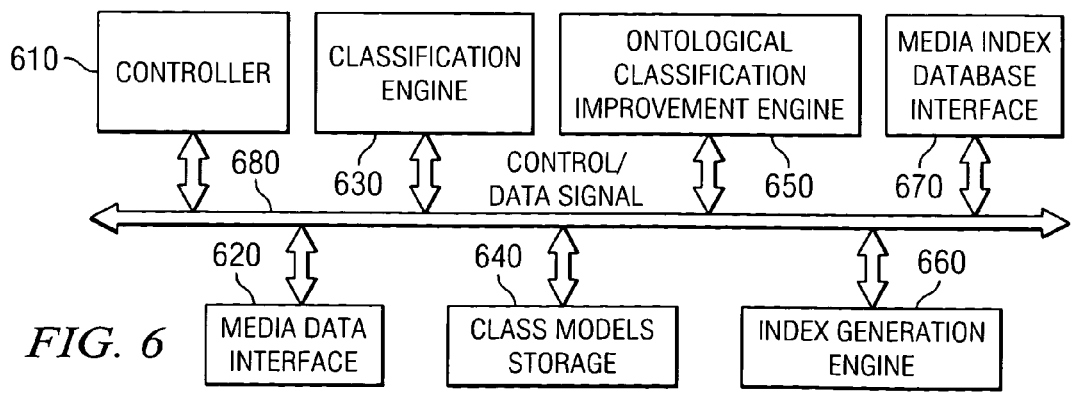
FIG. 6 is an exemplary diagram illustrating the primary operational components of a media classification mechanism in accordance with aspects of one exemplary embodiment of the present invention.

FIG. 6 is an exemplary diagram illustrating the primary operational components of a media classification mechanism in accordance with aspects of one exemplary embodiment of the present invention. The elements shown in FIG. 6 may be implemented in hardware, software, or any combination of hardware and software without departing from the spirit and scope of the present invention. In accordance with exemplary aspects of a preferred embodiment of the present invention, the elements depicted in FIG. 6 are implemented as computer executable instructions executed by one or more data processing devices.

As shown in FIG. 6, the media classification mechanism of the present invention includes a controller 610, a media data interface 620, a classification engine 630, a class models storage 640, an ontological classification improvement engine 650, an index generation engine 660 and a media index database interface 670. The elements 610-670 are in communication with one another via the control/data signal bus 680. Although a bus architecture is shown in FIG. 6, the present invention is not limited to such and any architecture that facilitates the communication of control/data signals between the elements 610-670 may be used without departing from the spirit and scope of the present invention.

The controller 610 controls the overall operation of the media classification mechanism and orchestrates the operation of the other elements 620-670. Media data that is to be classified in order to generate an index for representing the media data is received via the media data interface 620. The controller 610 detects the reception of this media data and instructs the classification engine 630 to operate on the media data to determine an initial set of classification confidence values for the various class models stored in the class models storage 640.

The class models in the class models storage 640 represent the various possible classifications or classifiers with which media data may be classified. The class models include the attributes of media data that are most characteristic of data that matches the corresponding classification. The confidence value that is determined for each possible classification, or class model, is a measure of the amount by which the attributes of the input media data matches the attributes associated with the class model. Thus, if the attributes of the input media data closely match the attributes of a class model, then the confidence that the classification associated with that class model applies to the input media data is high.

The class models are preferably organized in a hierarchical classification structure such that the class models represent nodes in the hierarchical classification structure. Thus, some class models may be parent nodes in the hierarchical classification structure, some class models may be child nodes, and others may be both parent nodes and child nodes. This hierarchical classification structure may be represent as a tree data structure as is generally known in the art.

The class models are models that are determined from training of the media classification mechanism. That is, as discussed above, training data in which the actual classifications for input media data are known a priori, are input to the media classification mechanism. Parameters associated with the class models are adjusted based on the results generated by the media classification mechanism operating on the input media data. The parameters are adjusted such that the results generated in subsequent iterations more closely match the actual classifications for the input media data. In this way, the parameters or attributes associated with each class model are trained to better predict whether input media data matches those particular classifications.

The result of the classification engine 630 operating on the input media data is a set of initial classification confidence values associated with each class model. Those class models that have a confidence value that is above a predetermined threshold confidence value may be determined to be applicable to the input media data. These class models may be used by the index generation engine 660 to generate corresponding indices for use in representing the media data in an index data structure. Thus, for example, if a particular portion of input media data includes an image of an automobile, and the class model for automobile has a high confidence value, i.e. higher than the predetermined threshold confidence value, then the corresponding index "automobile" may be associated with the input media data and may be included in an index data structure for the input media data.

The indices generated in this manner for a particular input media data may be used to generate an index data structure that represents that input media data. This index data structure may include the indices as well as information identifying the particular portion of input media data to which the indices pertain. This index data structure may then be stored in the media index database via the media index database interface 670 so that it may be used, for example, by the query processor 520, to determine which media content matches a received search query.

The exemplary embodiments of the present invention further provide a mechanism for improving the confidence values generated by the classification engine 630 during the classification operation. That is, after the classification engine 630 obtains an initial set of confidence values for the various class models in the class model storage 640, the ontological classification improvement engine 650 operates on the class hierarchy and initial set of confidence values to determine how to adjust the confidence values based on relationships between the class model and its ancestors in the class hierarchy and the relationships between the class model and its mutually exclusive neighbors in the class hierarchy. In this way, influence from the more reliable ancestors and the equally reliable neighbors of the class model are used to adjust the confidence level of the class model and obtain a more accurate estimation as to whether the input media data truly should or should not be classified into the classification associated with that class model.

Figure 7:
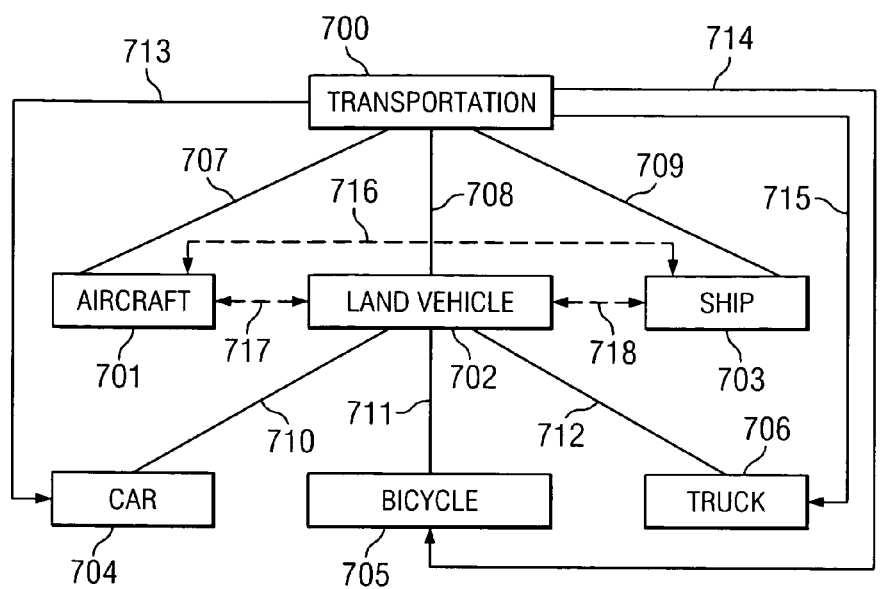
FIG. 7 is an exemplary diagram for illustrating the use of boosting factors and confusion factors in adjusting the correspondence of classifications to media content in accordance with exemplary aspects of the present invention.

FIG. 7 is an exemplary diagram for illustrating the use of boosting factors and confusion factors in adjusting the correspondence of classifications to media content in accordance with exemplary aspects of the present invention. As shown in FIG. 7, class models 700-706 are organized in an ontology structure for a multimedia information retrieval system. Class model 700 covers the semantics of class models 701, 702 and 703, and class model 702 covers the semantics of class models 704, 705 and 706. Thus, for example, one portion of media data with semantics of 704 must have semantics of 700 and 702. Unfortunately, the classifier or class model whose corresponding classification is located in the lower level of ontology structure is usually more unreliable. As mentioned above, this may be due to the training set of data not having enough instances of this classification in order to provide a reliable set of attributes for the classifier or class model.

Exemplary aspects of the present invention provide a mechanism for boosting an unreliable classifier or class model's accuracy by taking the information from more reliable classifiers or class models located as its ancestors. For example, class models 701, 702 and 703 take boosting factors 707, 708 and 709 from class model 700 respectively. Class models 704, 705 and 706 take boosting factors 710, 711 and 712 from class model 702 and class models 704, 705 and 706 also take boosting factors 713, 714 and 715 from class model 700. The exact amount of boosting factor that a classifier takes from its ancestors may be calculated by measuring data correlation. Similar data distribution between two classes implicates that the coherence between them tends to be high. Therefore, if the data correlation between class models 700 and 705 is larger than that between class models 702 and 705, the present invention increases the boosting factor 714 to be greater than boosting factor 711 and/or may reduce the boosting factor 711.

The exemplary embodiments of the present invention also differentiate class models that cannot be coexistent in terms of their semantics, i.e. mutually exclusive class models. For example, if one piece of media data has the semantics of class model 702, it cannot have the semantics of class model 701 or 703 at the same time. That is, in this classification scheme, a land vehicle cannot be an aircraft or a ship. The present invention uses confusion factors to adjust original confidence values associated with the classifiers or class models and further separates classes that cannot coexist in terms of their semantics by modifying the confidence values of these classifiers or class models. For example, a confusion factor 716 between class model 701 and class model 703, a confusion factor 717 between class model 701 and 702, and a confusion factor 718 between class model 702 and 703 may be employed in the depicted ontology structure.

In one exemplary embodiment of the present invention, the boosting factor by considering the confidence score correlation between a child class model and its ancestor class model. Similar confidence score distribution between two class models implicates that the coherence between them tends to be high. Therefore, if the confidence score distribution between the ancestor class model and the child class model has high correlation, more influence on the child class model is applied from the ancestor class model. The following exemplary algorithm is provided as an example implementation that describes the procedure of updating confidence scores using a boosting factor:

```
Input:
    s; /* An input data
    C_i; /* A single concept
    {C_j, ... C_k}; /* A set of concepts that are the ancestors of C_i
    p(s|C_i); /* The confidence score of s belonging to concept C_i
Output:
    p(s|C_i); /* Updated confidence score of s belonging to concept C_i
Variables:
    {λ_j^i, ... λ_k^i} /* Boosting factors of {C_j, ... C_k} to C_i
Begin:
    (1) for each C_l ∈ {C_j, ... C_k}
        /* Calculate the influence from C_l to C_i. If C_l and C_i have
        similar confidence score distribution, C_l will give more
        influence to C_i
    (2) λ_l^i=A/(B+exp(C*abs(p(s|C_i)−p(s|C_l))));
    (3) Endfor.
        /* Update confidence scores
    (4) p(s|C_i)=p(s|C_i)+ λ_j^i p(s|C_j)+ ... +λ_k^i p(s|C_k)
End
```

The function $A/(B+\exp(C*abs(p(s|C_i)-p(s|C_l))))$ is a monotonically decreasing function when C>0. This function is calculated as the weight of influence should be taken from Cl to Ci. The reason why this function was selected for this exemplary embodiment is because it is a smooth and continuous function. For example, when A=1, B=1 and c=−1, it is a sigmoid function.

In one exemplary embodiment, A is set to 1 and B is set to 1 for all classes. The parameter C varies for every pair of classes, determined by a correlation of confidence scores between the two classes, as obtained from training data. If the correlation between confidence scores of the two classes is high, the parameter C has a lower value. If the correlation between confidence scores of the two classes is low, the parameter C has a higher value. Thus, the parameter C is set as 1/cor(i, 1). With such an exemplary embodiment, the above identified function may be rewritten as:

$$1/(1+\exp(abs(p(s|C_i)-p(s|C_l))/cor(i,1)))$$

The calculation of the correlation of the confidence scores cor(i, 1) is described as follows. If there are n training data which truly belong to classes Ci and Cl, the confidence score of n training data from classes Ci and Cl can be thought as two random variables x and y, each with n observations. Given two random variables x and y, with mean mx and my, respectively, the covariance cov(x,y) is defined by:

$$cov(x,y)=E[(x-mx)*(y-my)]=E(x,y)-E(x)*E(y)$$

The statistical correlation of x and y is given by:

$$cor(x, y)=cov(x,y)/(std(x)*std(y))$$

in which std(x) is the standard deviation of variable x. If cor(i,1) is calculated in this way to be high, classes Ci and Cl are highly dependent, i.e. are more correlated, and thus, Ci takes more influence from Cl if Cl is the ancestor of Ci. Otherwise, if cor(i, 1) is calculated in this way to be low, classes Ci and Cl are not closely dependent, i.e. there is little correlation, and thus, Ci takes little influence from Cl if Cl is the ancestor of Ci.

As described above, in addition to boosting the confidence score of a class model based on a correspondence of the class model's original confidence score to the confidence scores of its ancestors, the present invention also updates confidence scores using a confusion factor determined from mutually exclusive class models. That is, given an input data s, the larger its confidence score from class $C_i$ compared to those from other classes that cannot coexist with $C_i$, the more likely that data s truly belongs to $C_i$. The Confusion_factor($s|C_i$), i.e. the probability of misclassifying s into class $C_i$, is defined as the reciprocal of the difference between $p(s|C_i)$ and the maximum confidence score from other mutually exclusive classes. The larger the difference, the more confident s should belong to $C_i$. Accordingly, we increase confidence score $p(s|C_i)$.

---

Input:
s; /* An input data
$C_i$; /* A single concept
$\Theta = \{C_j, \ldots C_k\}$; /* A set of concepts that cannot coexist with $C_i$
$p(s|C_i)$; /* The confidence score of s belonging to concept $C_i$
Output:
$p(s|C_i)$; /* Updated confidence score of s belonging to concept $C_i$
Function calls:
$f(x)$; /* A positive and monotonously increasing function
Begin:
    /* Find the maximum confidence score from classes in $\Theta$
    (1) max_otherscore=MAX($p(s|C_l)$), $C_l \in \Theta$
    /* Calculate the probability of misclassifying s as the reciprocal of the difference between $p(s|C_i)$ and the maximum confidence score of classes in $\Theta$
    (2) Confusion_factor($s|C_i$)=1/f($p(s|C_i)$− max_otherscore)
    /* Update confidence score of data s
    (3) $p(s|C_i)$ = $p(s|C_i)$/Confusion_factor($s|C_i$)
End.

---

Both the boosting factor and the confusion factor are applied to the confidence score for a classifier or class model to determine a modified or adjusted confidence score that is more representative of the actual confidence that the data corresponds to the classification for that classifier or class model. This modified or adjusted confidence score is then used to determine whether an index corresponding to that classifier or class model should be stored in an index data structure representing the input media data. In this way, a more accurate set of indices for input media data is generated for use in media data retrieval, media data modeling, and the like.

Figure 8:
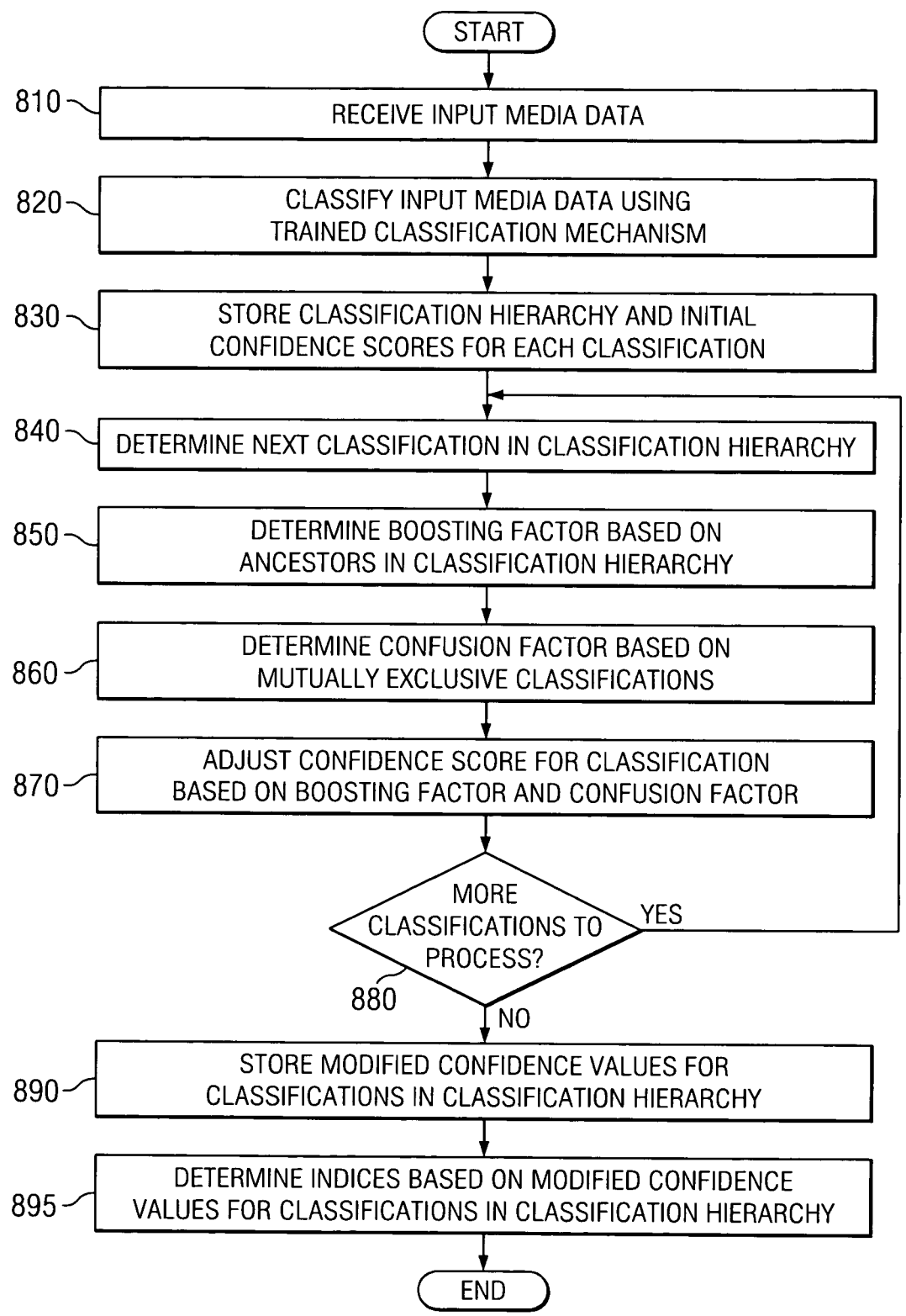
FIG. 8 is a flowchart outlining an exemplary operation of performing media content classification in accordance with one exemplary embodiment of the present invention.

FIG. 8 is a flowchart outlining an exemplary operation of performing media content classification in accordance with one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts by receiving input media data that is to be classified (step 810). The input media data is classified using a trained classification mechanism (step 820) and the classification hierarchy and initial confidence scores for each classification are stored (step 830).

The next classification in the classification hierarchy is then determined (step 840). This would be the root classification the first time this step is encountered and will be child classifications of the root classification in later iterations. The boosting factor to be applied to this classification based on its ancestors is then determined (step 850). The confusion factor that is to be applied to this classification based on mutually exclusive classifications is also determined (step 860). The confidence score associated with this classification is then adjusted based on the boosting factor and the confusion factor (step 870).

A determination is then made as to whether there are any more classifications in the classification hierarchy that need to have their confidence scores adjusted (step 880). If so, the operation returns to step 840. Otherwise, the modified or adjusted confidence scores are stored (step 890) and are used to determine which classifications apply to the input media data to thereby generate indices for the input media data (step 895). These indices may be stored in an index data structure in an index database for later use by a search engine, media modeling system, or the like.

Figure 9A:
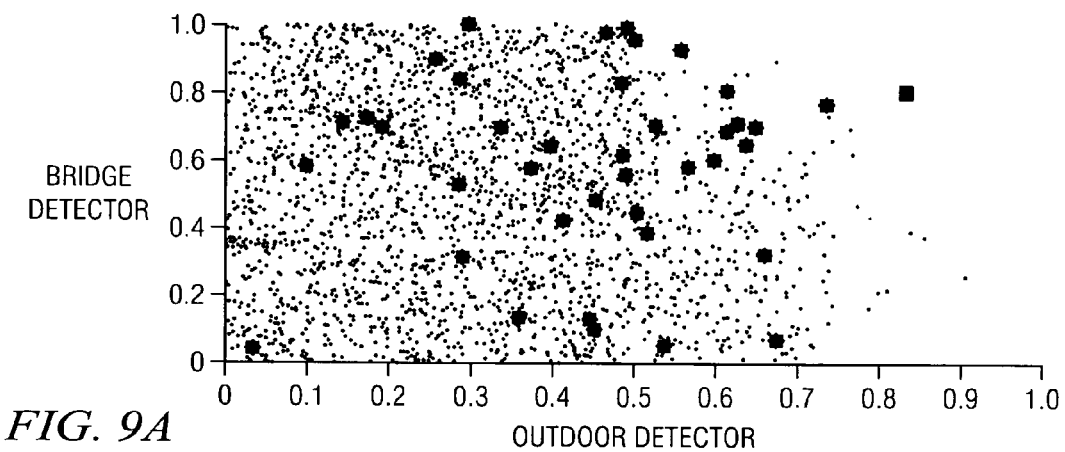
FIGS. 9A and 9B are plots illustrating the effects of using boosting factors in accordance with the exemplary aspects of the present invention to improve accuracy of media classification.
Figure 9B:
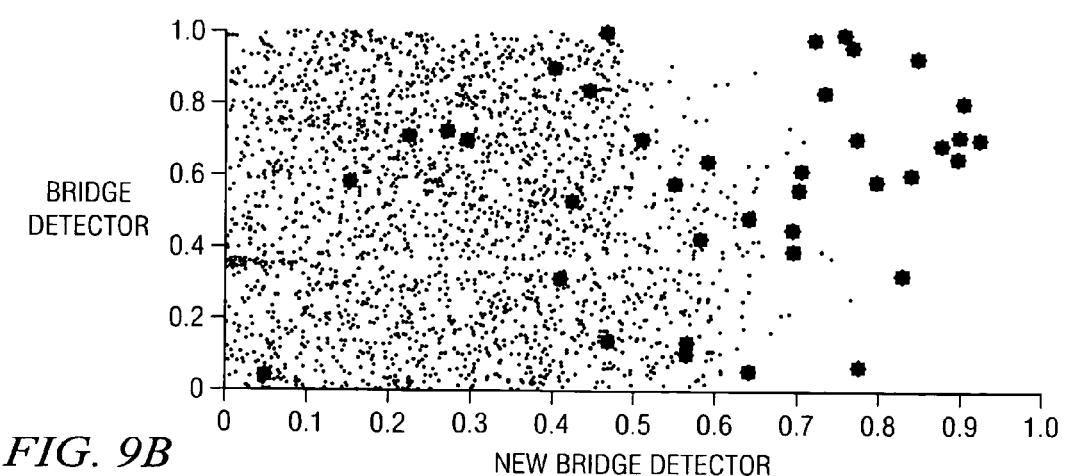

FIGS. 9A and 9B are plots illustrating the effects of using boosting factors in accordance with the exemplary aspects of the present invention to improve accuracy of media classification. FIG. 9A depicts the effects of using boosting factor to improve the accuracy of classifiers. FIG. 9A shows the confidence score from a "Bridge" classifier or class model and a more reliable "Outdoors" classifier or class model. In an ontology structure, the class model "Outdoors" is the ancestor of the class model "Bridge". Each point in the figure represents one piece of training data, in which a square point represents true "Bridge" data and '.' points represent false "Bridge" data. The x-axis shows the confidence scores from the "Outdoor" classifier or class model and the y-axis shows the confidence scores from the "Bridge" classifier or class model. From the illustration it is clear that the classifier for "Bridge" is much more unreliable than that of "Outdoors." Many true "Bridge" data have low confidence scores from the "Bridge" classifier, and many false "Bridge" data have high confidence scores.

FIG. 9B shows the updated confidence scores of the "Bridge" classifier or class model obtained by using a boost factor in accordance with the exemplary aspects of the present invention. The y-axis in FIG. 9B shows the original confidence scores from the original "Bridge" classifier or class model and the x-axis shows the updated confidence scores from the modified "Bridge" classifier or class model after applying a boosting factor. The boosting factor from the "Outdoor" classifier to the "Bridge" classifier improves the accuracy of the "Bridge" classifier. Now, true "Bridge" data tend to get higher confidence scores from the boosted "Bridge" classifier, especially for those true "Bridge" points that have low y-value which have a higher opportunity to be correctly classified by using updated confidence scores (see x-axis).

Figure 10A:
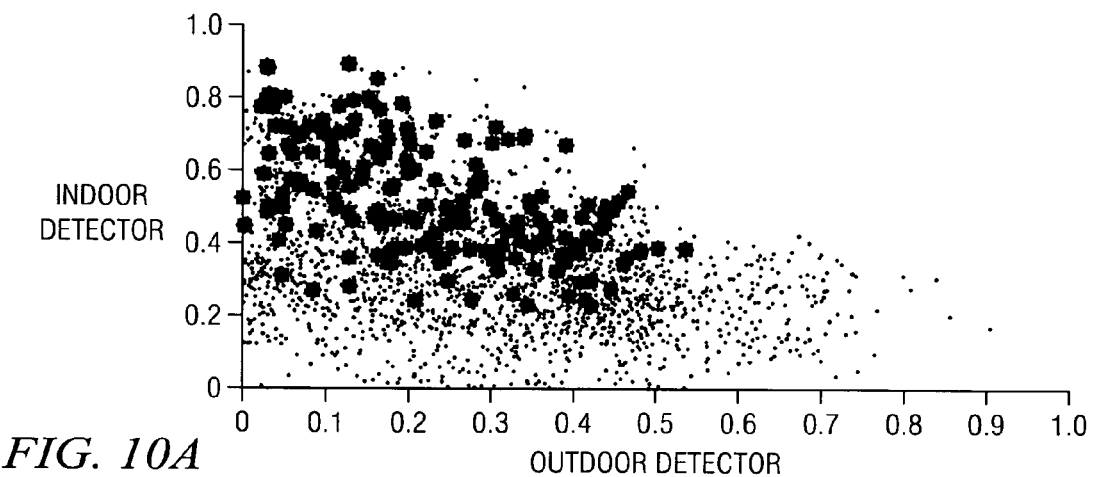
FIGS. 10A and 10B are plots illustrating the effects of using confusion factors in accordance with the exemplary aspects of the present invention to improve the accuracy of media classification.
Figure 10B:
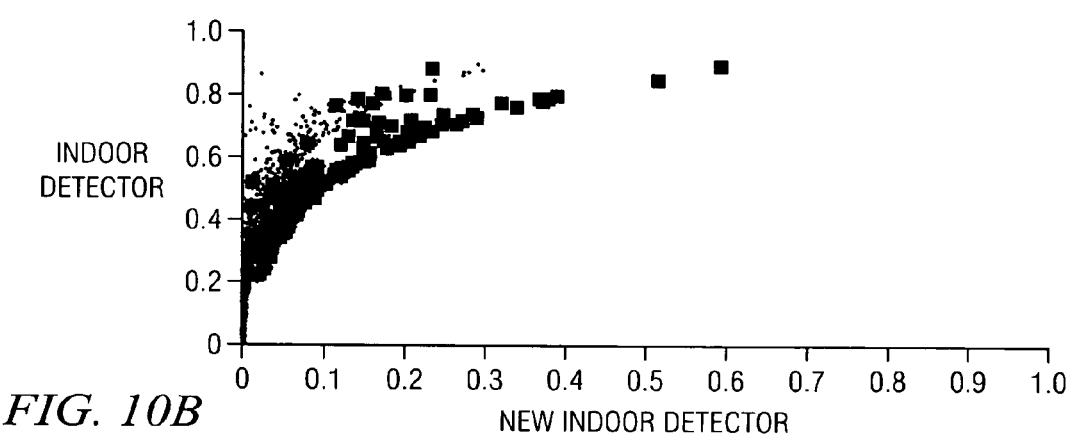

FIGS. 10A and 10B are plots illustrating the effects of using confusion factors in accordance with the exemplary aspects of the present invention to improve the accuracy of media classification. FIG. 10A shows the confidence scores from the "Outdoor" classifier or class model and the "Indoor" classifier or class model. The classifications of "Outdoor" and "Indoor" cannot coexist and thus, are mutually exclusive. Each point represents one piece of media data in which the square points are true "Indoor" data and '.' points are false "Indoor" data. The x-axis shows the confidence scores from the "Outdoor" classifier or class model and the y-axis shows the scores from the "Indoor" classifier or class model. Many true "Indoor" data have low confidence scores from the "Indoor" classifier. The misclassification rate for "Indoor" classifier is more than 50%.

The y-axis in FIG. 10B represents the confidence scores from the "Indoor" classifier and the x-axis represents the updated scores from a modified "Indoor" classifier after applying a confusion factor. The confusion factor in the present invention can help increase the accuracy of the original classifier by taking into account its mutually exclusive neighbor "Outdoor." True "Indoor" data can get high confidence scores from the new "Indoor" classifier by using the confusion factor (see x-axis).

Thus, the present invention provides a mechanism for improving the confidence scores associated with classifiers or class models in a hierarchical classification mechanism so that more accurate classifications of media data are provided. The present invention uses both a relationship between a classifier and its more reliable ancestor classifiers and a relationship between the classifier and its mutually exclusive classifiers to determine how to adjust the confidence of the classifier to be more representative of whether the media data actually does belong with that classification or not.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for classifying media data comprising:
   responsive to receiving input media data, classifying the input media data for later access based on classification;
   applying a plurality of classifiers in a hierarchical classification structure to the input media data;
   generating confidence scores for the plurality of classifiers in the hierarchical classification structure;
   modifying a confidence score automatically for a classifier in the hierarchical classification structure based on a relationship between the classifier and other classifiers in the hierarchical classification structure and the confidence scores of the other classifiers in the hierarchical classification structure, wherein modifying the confidence score automatically for a classifier includes applying a confusion factor to the confidence score based on a correspondence between the confidence score and confidence scores of mutually exclusive classifiers in the hierarchical classification structure, and wherein the confusion factor is determined as a function of a difference between the confidence score of the classifier and a maximum confidence score from mutually exclusive classifiers in the hierarchical classification structure;
   generating a representation of the input media data based on the modified confidence score being higher than a predetermined threshold confidence score; and
   storing the generated representation of the input media data.

2. The method of claim 1, wherein modifying the confidence score automatically for a classifier includes boosting the confidence score using a boosting factor determined based on a correspondence between the confidence score and confidence scores of ancestor classifiers in the hierarchical classification structure.

3. The method of claim 2, wherein the boosting factor is determined as a function of a difference between the confidence score of the classifier and confidence scores of each ancestor classifier in the hierarchical classification structure.

4. The method of claim 1, wherein generating a representation of the input media data includes generating an index data structure based on the modified confidence score.

5. The method of claim 1, further comprising: using the stored representation of the input media data to access the input media data.

6. The method of claim 5, wherein using the stored representation of the input media data to access the input media data includes:
   receiving a search query;
   determining if terms in the search query match terms in the stored representation of the input media data; and
   accessing the input media data if the terms in the search query match terms in the stored representation of the input media data.

* * * * *